(12) United States Patent
Im

(10) Patent No.: US 9,995,900 B2
(45) Date of Patent: Jun. 12, 2018

(54) STACKED OPTICAL FIBER STORAGE COMPARTMENT

(71) Applicant: Chae Hyeon Im, Gwangju (KR)

(72) Inventor: Chae Hyeon Im, Gwangju (KR)

( * ) Notice: Subject to any disclaimer, the term of this patent is extended or adjusted under 35 U.S.C. 154(b) by 0 days. days.

(21) Appl. No.: 15/512,210

(22) PCT Filed: Sep. 22, 2015

(86) PCT No.: PCT/KR2015/009941
§ 371 (c)(1),
(2) Date: Mar. 17, 2017

(87) PCT Pub. No.: WO2016/048004
PCT Pub. Date: Mar. 31, 2016

(65) Prior Publication Data
US 2017/0269324 A1 Sep. 21, 2017

(30) Foreign Application Priority Data
Sep. 22, 2014 (KR) .......................... 10-2014-0126159

(51) Int. Cl.
*G02B 6/46* (2006.01)
*G02B 6/44* (2006.01)
(Continued)

(52) U.S. Cl.
CPC ............. *G02B 6/46* (2013.01); *G02B 6/2553* (2013.01); *G02B 6/2555* (2013.01); *G02B 6/3897* (2013.01); *G02B 6/445* (2013.01)

(58) Field of Classification Search
CPC ..................................................... G02B 6/445
See application file for complete search history.

(56) References Cited

U.S. PATENT DOCUMENTS

2009/0238531 A1* 9/2009 Holmberg .............. G02B 6/445
385/135

FOREIGN PATENT DOCUMENTS

JP          2005-191211     7/2005
KR       10-1999-0062297    7/1999
(Continued)

*Primary Examiner* — Michelle R Connelly
(74) *Attorney, Agent, or Firm* — Lex IP Meister, PLLC

(57) ABSTRACT

The present invention relates to a stacked optical fiber storage compartment formed to receive optical fibers, facilitate the connection of optical fibers and optical jumper cords, and facilitate the arranging and grouping of optical fibers. The stacked optical fiber storage compartment according to the present invention comprises: a compartment body including a main body portion having a receiving space and an open upper portion, and an opening and closing cover pivotably coupled on the main body portion to open and close the open upper portion of the main body portion; and an optical fiber connecting unit installed on the main body portion to receive and connect the respective optical fibers withdrawn from each of the tubes for optical cables extending into the compartment body. The optical fiber connecting unit comprises: a support plate mounted on the main body portion; connecting tube storing trays pivotably coupled through a hinge shaft to the support plate, and having optical connecting tube storing portions for connecting optical fibers; first and second keeping trays disposed at both sides of the respective connecting tube storing trays and including first and second keeping receiving portions that keep optical fibers or optical jump fibers and support same; and an optical fiber connecting unit installed on the support plate, and having an optical jump fiber when an optical fiber supported on the first keeping tray or the second keeping tray is jumped to a connecting tube storing tray from among the tube storing trays.

9 Claims, 14 Drawing Sheets

(51) Int. Cl.
G02B 6/255 (2006.01)
G02B 6/38 (2006.01)

(56) References Cited

FOREIGN PATENT DOCUMENTS

| KR | 10-2000-0026620 | 5/2000 |
| KR | 10-2000-0053342 | 8/2000 |
| KR | 10-2012-0131498 | 12/2012 |

\* cited by examiner

STACKED OPTICAL FIBER STORAGE COMPARTMENT

TECHNICAL FIELD

The present invention relates to a stacked optical fiber storage compartment, and more particularly, to a stacked optical fiber storage compartment capable of facilitating arranging and sorting optical fibers while the optical fibers are accommodated therein and fixing cables of optical fibers.

BACKGROUND ART

With rapid development of information and communication field, there is a great need for a high-speed communication facility focused on a subscriber network. For this, an optical cable intermediate switching device capable of efficiently distributing/switching an optical feeder cable from a telephone office and an optical distribution cable to a subscriber is installed on an optical cable line. The optical cable intermediate switching device has a splice tray provided inside a compartment body and selectively distributes/switches an optical lead-in cable and an optical lead-out cable.

Generally, a conventional splice tray includes an excess accommodating part configured to accommodate an excess optical fiber disposed at both sides with respect to a cord support part configured to support an optical jumper cord for connecting optical fibers. The conventional splice tray has disadvantages in that distributing/switching work and maintenance and repair work are inconvenient due to optical fibers not being arranged for each subscriber or each function, and that protecting optical fibers and arranging excess of jumper cords and optical fibers are not performed efficiently.

Particularly, a conventional storage compartment accommodates an excessive number of optical fibers such that work of separating the fibers is difficult and a failure occurs due to cutting and bending other fibers when the separating work is performed.

Meanwhile, in U.S. Pat. No. 5,402,515, an optical fiber distribution system in which a card type tray and a mechanical connector are used instead of a connector and an adaptor to distribute/switch optical fibers is disclosed.

According to such an optical fiber distribution system, internal modules having a plurality of trays attached to perform pivoting motion with respect to an external cabinet or a compartment body are included. Each tray includes an optical fiber arranging part, an optical fiber switching part including a mechanical connector, and a jumper optical fiber arranging part. An optical fiber led into a tray is connected to one side of the mechanical connector of the optical fiber switching part, and a jumper optical fiber stored in the jumper optical fiber arranging part is connected to the other side of the mechanical connector. Consequently, the jumper optical fiber can be connected to an optical lead-in cable in a tray of a different internal module or a different tray in the same module such that distribution/switching between optical cables is performed.

In such a distribution system, the optical fiber arranging part and a splicing part cannot be located on the same plane. Thus, there is a problem in that a size of the distribution system becomes relatively large, and a jumper optical fiber can be damaged due to external force.

Meanwhile, each nation or optical communication carrier uses an optical cable having a different number of optical fibers. An optical cable that is already being used is replaced with an optical cable having different number of optical fibers in some cases. Like this, when a cable having different number of optical fibers is used, the number of optical fiber splicing parts of a mechanical connector being used for splicing optical fibers should Moreover be different. When the cable having a different number of optical fibers is used, trays cannot be used compatibly. Particularly, when an optical jump fiber is spliced from a tray at one side to a tray adjacent thereto, a means for separately protecting the optical jump fiber is required. When the number of optical jump fibers increases, interference between optical jump fibers and trays relatively increases. When one optical fiber that is arranged and spliced in a tray is short-circuited, a damaged optical fiber is difficult to be checked, and a tube through which an optical fiber is drawn out cannot be fixed easily.

DISCLOSURE

Technical Problem

The present invention is for solving the above problems. It is an aspect of the present invention to provide a stacked optical fiber storage compartment in which a splice tray for splicing optical fibers is provided in a compartment body, and which is capable of efficiently managing and protecting optical fibers by separating the optical fibers for each type in the splice tray and storing and connecting the optical fibers therein and facilitating maintenance and repair of the optical fibers.

It is another aspect of the present invention to provide a stacked optical fiber storage compartment capable of installing a plurality of trays in a support plate and rotatably supporting the trays, easily fixing a tube that surrounds fibers to the support plate or a tray, and preventing damage to an optical jump fiber by preventing the optical jump fiber from interfering with rotation of the trays.

It is yet another aspect of the present invention to provide a stacked optical fiber storage compartment in which an optical jump fiber can be easily installed by fixing a tube to a support plate.

Technical Solution

To solve the above technical problems, a stacked optical fiber storage compartment according to the present invention includes a compartment body including a main body portion having an accommodating space and an open upper portion, and an opening-and-closing cover rotatably coupled to the main body portion to open and close the open upper portion of the main body portion; and an optical fiber splicing unit that is installed in the main body portion for accommodating and splicing respective optical fibers drawn from respective tubes of optical cables extending into the compartment body, and includes a support plate mounted on the main body portion, splicing tube storing trays rotatably coupled to the support plate by a hinge shaft and having optical splicing tube storage parts for splicing optical fibers formed, first and second excess trays including first and second excess accommodating parts disposed at both sides of each of the splicing tube storing trays to support excess of an optical fiber or an optical jump fiber, and an optical jump fiber support unit installed at the support plate to support the optical jump fiber when an optical fiber supported in a first excess tray or a second excess tray is jumped to one of the splicing tube storing trays.

In the present invention, each of the first excess trays and the second excess trays may be rotatably coupled to the support plate by a hinge shaft and be independently rotated.

One of the first excess trays and the second excess trays may be integrally formed with the splicing tube storing tray. The first excess tray may be connected to one side of the splicing tube storing tray by a first connecting rib, the second excess tray may be connected to the splicing tube storing tray by a second connecting rib, and the splicing tube storing tray may be integrated with the first and second excess trays.

The first excess tray may include a first excess tray main body portion rotatably supported at the support plate by a hinge shaft, a first protruding step formed along an edge of the first excess tray main body portion and having a tube and an optical fiber introducing part formed at both sides, first support ribs extending from an end of the first protruding step toward a central portion of the first tray main body portion to support an optical fiber, and a tube fixing part formed in a first tube and optical fiber introducing part to fix the tube.

The tube fixing part may have first guide parts formed at both sides of the tube and optical fiber introducing part and extending from a first peripheral step, one or more first partition ribs formed between the first guide parts, and first gripping protrusions formed at opposing surfaces of the first guide parts and the first partition ribs to grip a tube.

The first excess tray main body portion may have a cap configured to surround a tube supported by the first guide part. The cap is hinge-connected to one side of the first guide part by a flexible connecting part and has a locking step formed at an end and locked to the guide part or the first peripheral step at the other side.

Meanwhile, the optical jump fiber support unit may include optical jump fiber guide rods installed at the support plate between the splicing tube storing trays and the first excess tray or the second excess tray, and a deviation preventing member installed at an end of the optical jump fiber guide rods to prevent an optical jump fiber from deviating from the optical jump fiber guide rods, and further include a tube gripping part installed at both side surfaces of the support plate, branched from a cable, and configured to grip tubes that surround optical fibers.

Advantageous Effects

According to the present invention, a stacked optical fiber storage compartment can prevent an increase of working time for separating optical fibers which are tangled with one another or twisted during switching work by separating the optical fibers for each type and accommodating excess of each of the optical fibers, can efficiently manage optical fibers, and can increase an accommodation amount of excess optical fibers.

Moreover, because a tube can be easily fixed to first and second excess trays or a support plate and the tube can be prevented from deviating due to an external force, damage to an optical fiber can be prevented. Particularly, because using a separate protective tube as in the related art is not required when installing an optical jump fiber, workability can be improved.

MODES OF THE INVENTION

Figure 1:
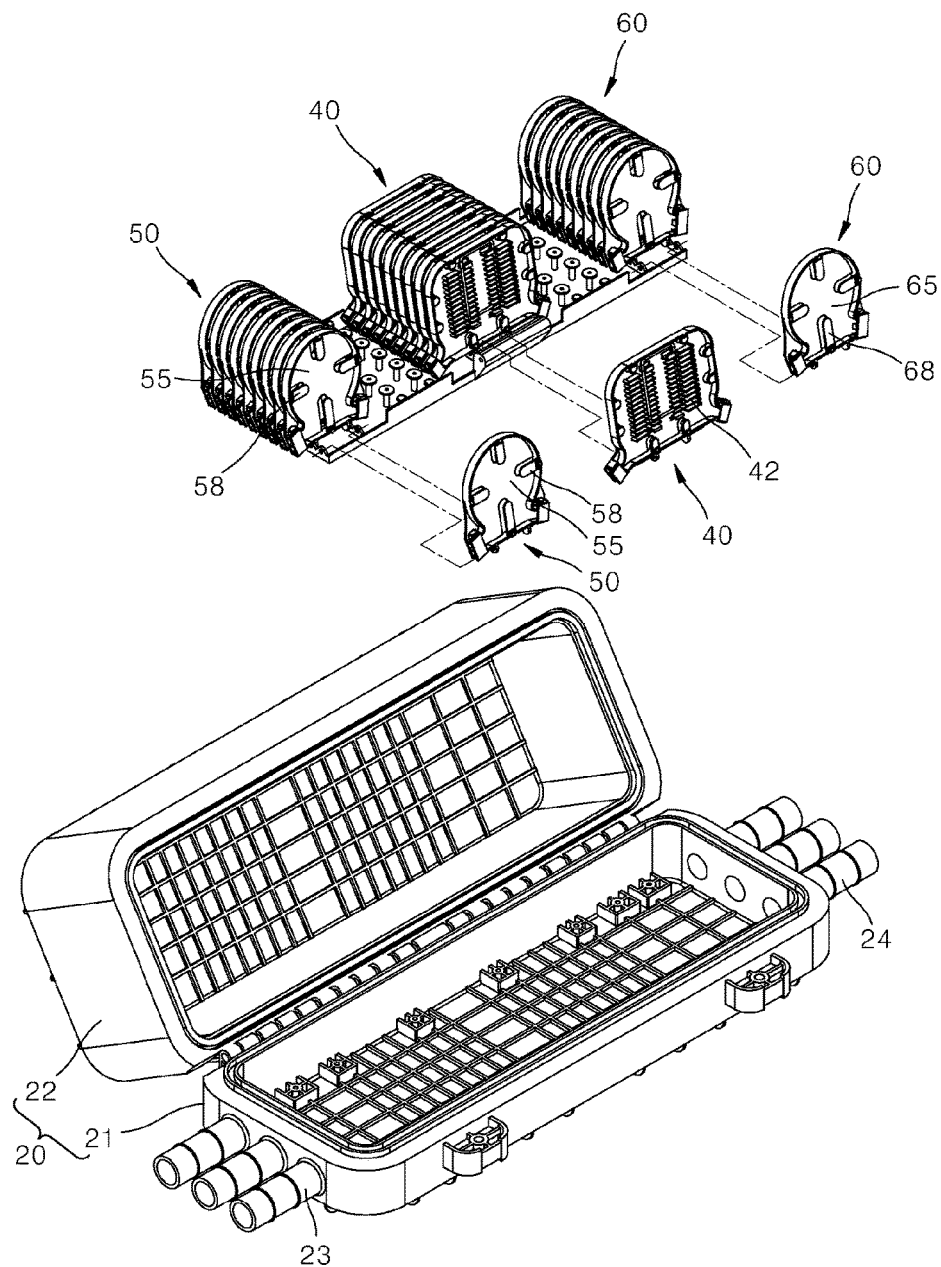
FIG. 1 is a perspective view illustrating a stacked optical fiber storage compartment according to an embodiment of the present invention.

According to the present invention, a stacked optical fiber storage compartment can separate optical fibers for each type, accommodate excess of each of the optical fibers, and splice the optical fibers to one another. Embodiments of the stacked optical fiber storage compartment are illustrated in FIGS. 1 to 10.

Referring to the drawings, a stacked optical fiber storage compartment 10 according to the present invention includes a compartment body 20 and an optical fiber splicing unit 30 mounted inside the compartment body 20.

The compartment body 20 is for providing an accommodation space capable of accommodating the optical fiber splicing unit 30, an optical fiber supported in the optical fiber splicing unit 30, and an optical fiber, i.e., an optical jumper cord, and includes a main body portion 21 and an opening-and-closing cover 22 rotatably coupled to the main body portion 21.

The main body portion 21 has a rotating and coupling part formed at one side and is formed to mount the optical fiber splicing unit 30. Further, an insertion part 23 and a withdrawal part 24 are formed at both ends of the main body portion 21 to insert and withdraw an optical cable 200. The opening-and-closing cover 22 has one side rotatably coupled to the rotating and coupling part of the main body portion 21, and can protect the optical fiber splicing unit 30 installed in the main body portion 21 by covering a upper portion of the main body portion 21. The compartment body 20 can be formed in various shapes other than this embodiment as long as the shape is capable of mounting the optical fiber splicing unit 30.

The optical fiber splicing unit 30 can arrange and accommodate optical fibers and optical jump fibers according to type so that the optical fibers and the optical jump fibers are easily sorted.

As illustrated in FIGS. 1 to 10, the optical fiber splicing unit 30 is installed in the main body portion to accommodate and splice each of the optical fibers 220 and optical jump fibers 230 withdrawn from each of tubes 210 of optical cables 200 extending into the compartment body 20, and includes a support plate 31 mounted in the main body portion 21. Moreover, optical splicing tube storage parts 42 rotatably coupled to the support plate 31 by a hinge shaft 41 and configured to splice the optical fibers 220 are installed in the support plate 31 so that splicing tube storing trays 40 can be stacked in front and rear directions. First and second excess trays 50 and 60 including first and second excess accommodating parts configured to support excess of optical fibers or optical jump fibers to be spliced to be supplied to the splicing tube storing trays 40 are installed at both sides of each of the splicing tube storing trays 40. An optical jump fiber support unit 70 configured to support an optical jump fiber that supports the optical jump fibers 230 when an optical fiber supported in the first excess tray 50 or the second excess tray 60 is jumped to one of the splicing tube storing trays 40 is installed in the support plate 31.

The optical fiber splicing unit 30 according to the present invention configured as described above will be described in more detail below for each element.

The support plate 31 that constitutes the optical fiber splicing unit 30 is fixed and installed inside the main body portion 21. Hinge brackets 33 having hinge holes 32 into which hinge shafts 41 formed at a lower surface of each of the splicing tube storing trays 40 are inserted are installed at an upper surface of the support plate 31. Insertion grooves 33a configured to limit angle of rotation of the splicing tube storing trays 40 are formed between the hinge holes 32 of the hinge brackets 33. To be inserted and fixed to the main body portion 21, the shape of the support plate 31 is not limited to a plate shape. According to an arrangement structure of the first and second excess trays 50 and 60 or the splining tube storing trays 40 or an arrangement structure of the optical fibers 220 and the optical jump fibers 230, the support plate 31 may have a stepped configuration or a plurality of support plates 31 may be present.

Optical splicing tube storage parts 42 configured to support optical fibers spliced at a front surface or a rear surface of the splicing tube storing trays 40 are formed in the splicing tube storing trays 40 rotated by the hinge shafts 41 being coupled to the hinge brackets 33 installed in the support plate 31. The optical splicing tube storage parts 42 may be formed of ribs that protrude from the front surface of the splicing tube storing trays 40 and are spaced apart from one another at predetermined intervals.

Figure 2:
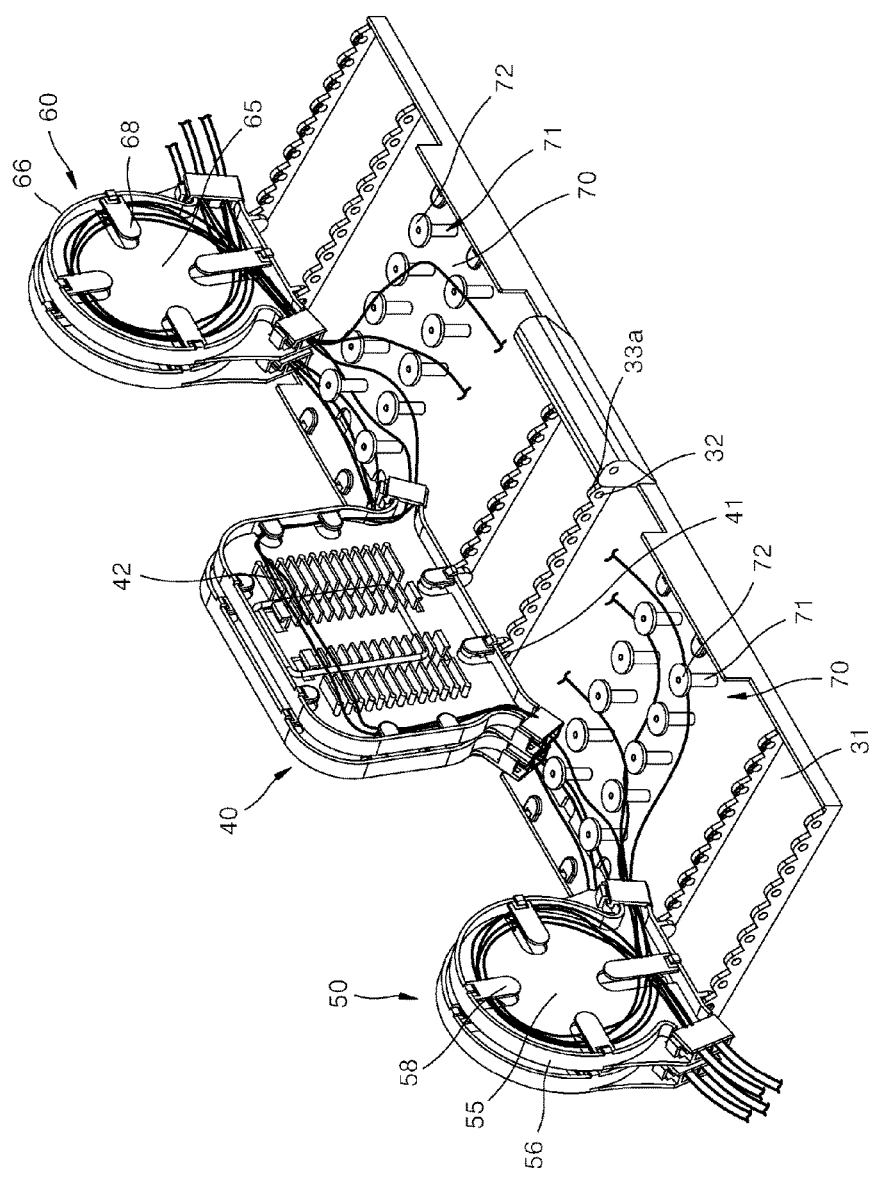
FIG. 2 is a perspective view illustrating an optical fiber splicing unit of FIG. 1.

Meanwhile, as illustrated in FIGS. 1 and 2, the first excess trays 50 and the second excess trays 60 installed at both sides of the splicing tube storing trays 40 may Moreover have a structure of being coupled to a hinge bracket installed in the support plate 31 (a structure same as that described above) by a hinge shaft and be rotated independently. The first excess trays 50 are installed in the support plate 31 while being spaced apart at predetermined intervals at a side corresponding to one side surface of the splicing tube storing trays 40, and the second excess trays 60 are installed in the support plate 31 while being spaced apart at predetermined intervals at a side corresponding to the other side surface of the splicing tube storing trays 40.

Figure 3:
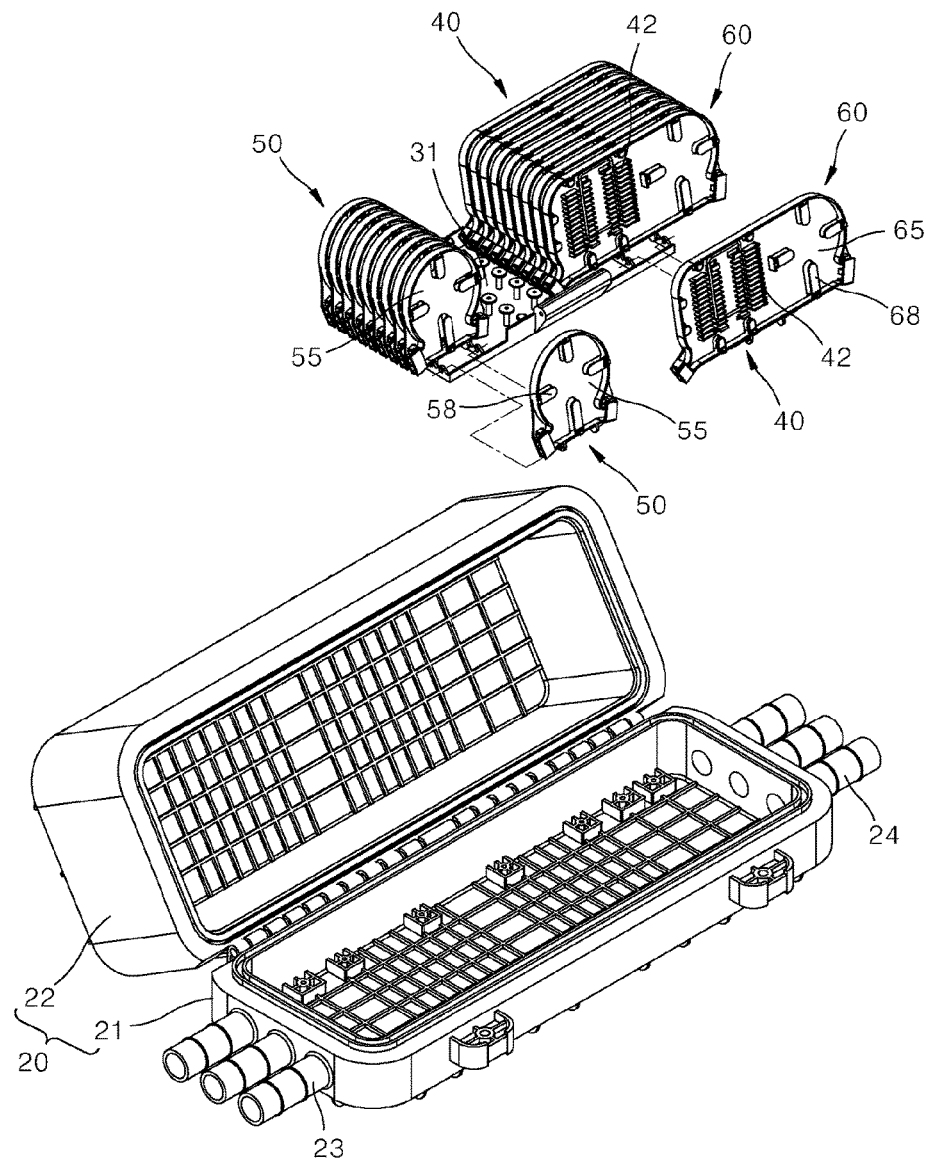
FIG. 3 is a perspective view illustrating a stacked optical fiber storage compartment according to an embodiment of the present invention.
Figure 4:
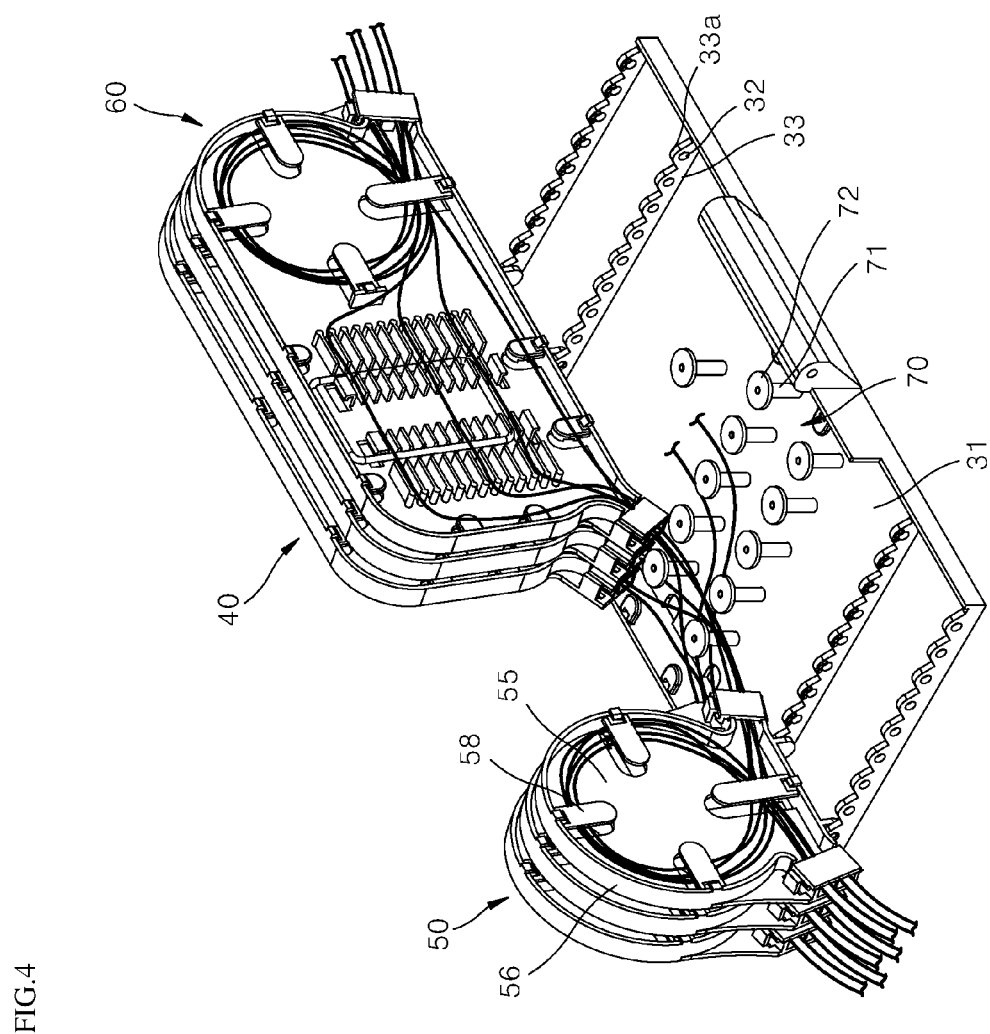
FIG. 4 is a perspective view illustrating an optical fiber splicing unit of FIG. 3.

As illustrated in FIGS. 3 and 4, one of the first excess trays 50 and the second excess trays 60 may be integrally formed with the splicing tube storing trays 50. In this case, the optical jump fiber support unit 70 is installed between the first or second excess trays installed to be spaced apart from the splicing tube storing trays 40.

Figure 5:
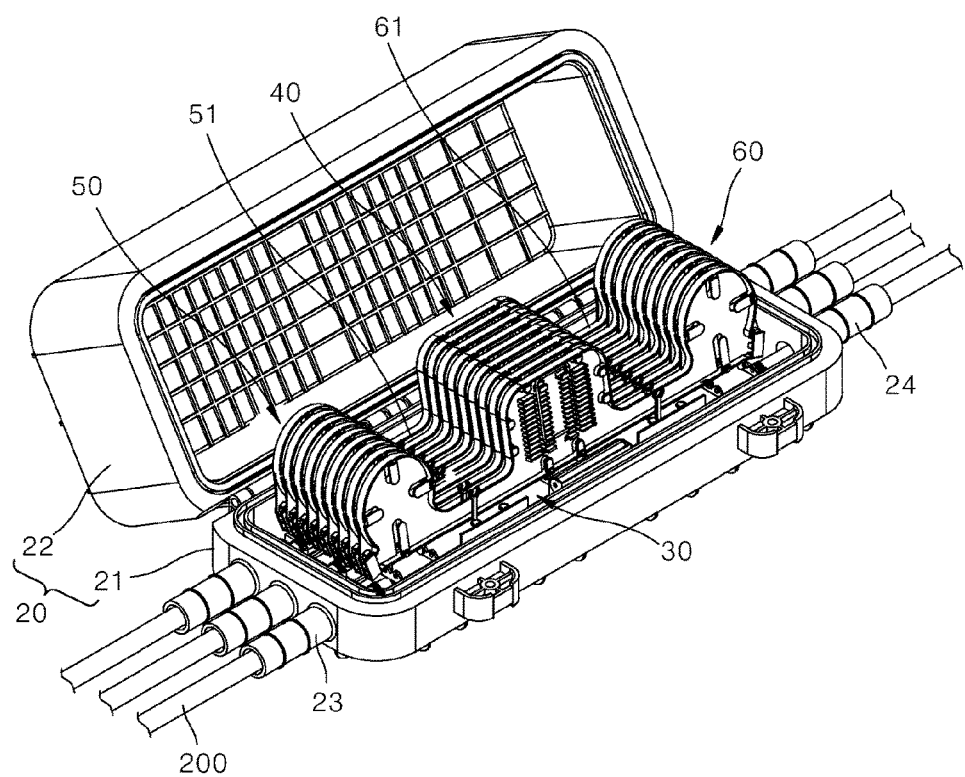
FIG. 5 is a perspective view illustrating a stacked optical fiber storage compartment according to an embodiment of the present invention.
Figure 6:
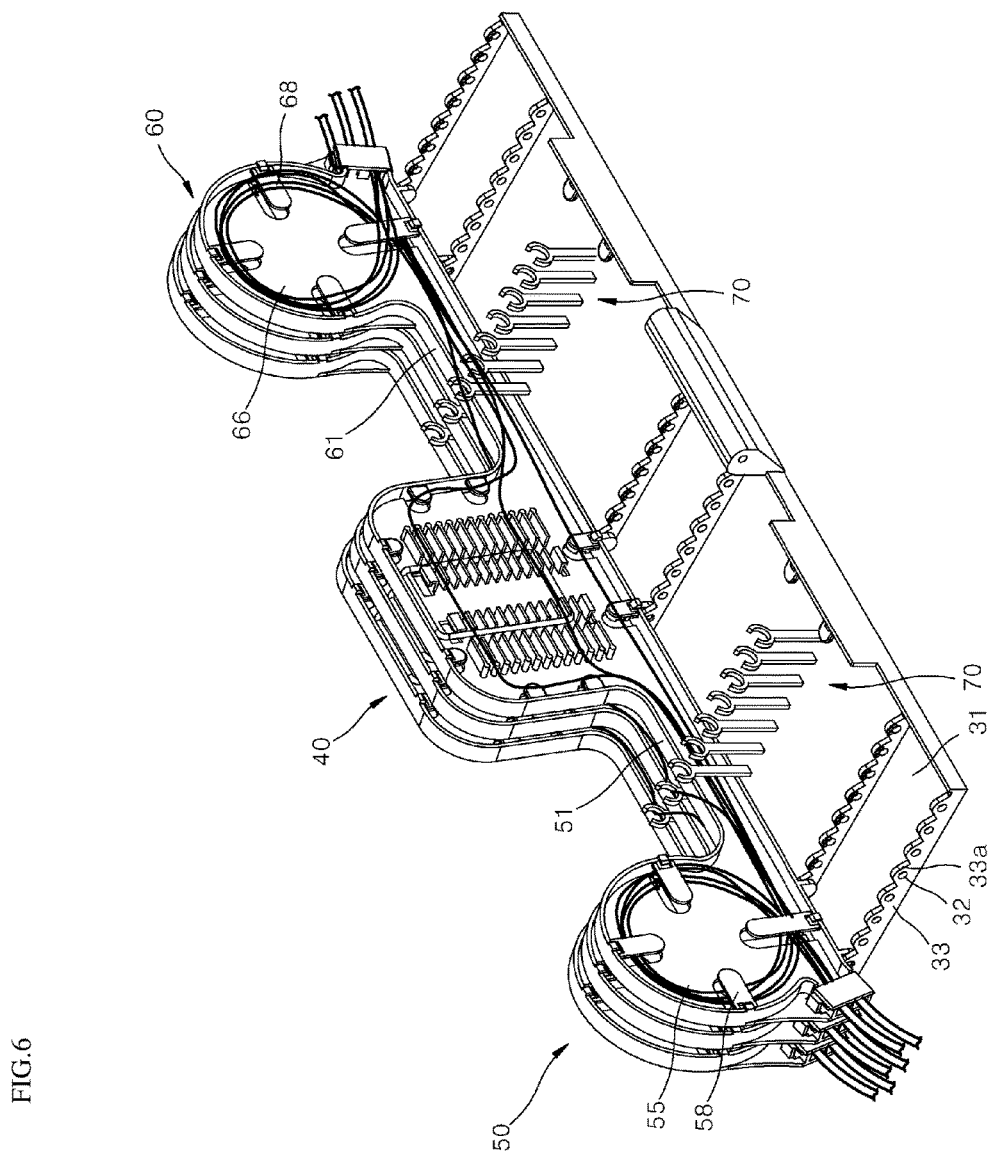
FIG. 6 is a perspective view illustrating an optical fiber splicing unit of FIG. 5.

FIGS. 5 and 6 illustrate a different embodiment in which the first and second excess trays are installed at both sides of the splicing tube storing trays. Referring to the drawings, the first excess trays 50 may be connected to one side of the splicing tube storing trays 40 by a first connecting rib 51, the second excess trays 60 may be connected to the splicing tube storing trays 40 by a second connecting rib 61, and the splicing tube storing trays 40 may be integrally formed with the first and second excess trays 50 and 60. Here, the first and second connecting ribs 51 and 61 may have insertion passages 52 and 62 formed to prevent the optical fibers 220 passing therethrough from deviating to the outside, and a deviation preventing protrusion (not illustrated) configured to prevent optical fibers from deviating from the insertion passages 52 and 62 may be formed at edges of the insertion passages 52 and 62.

Figure 7:
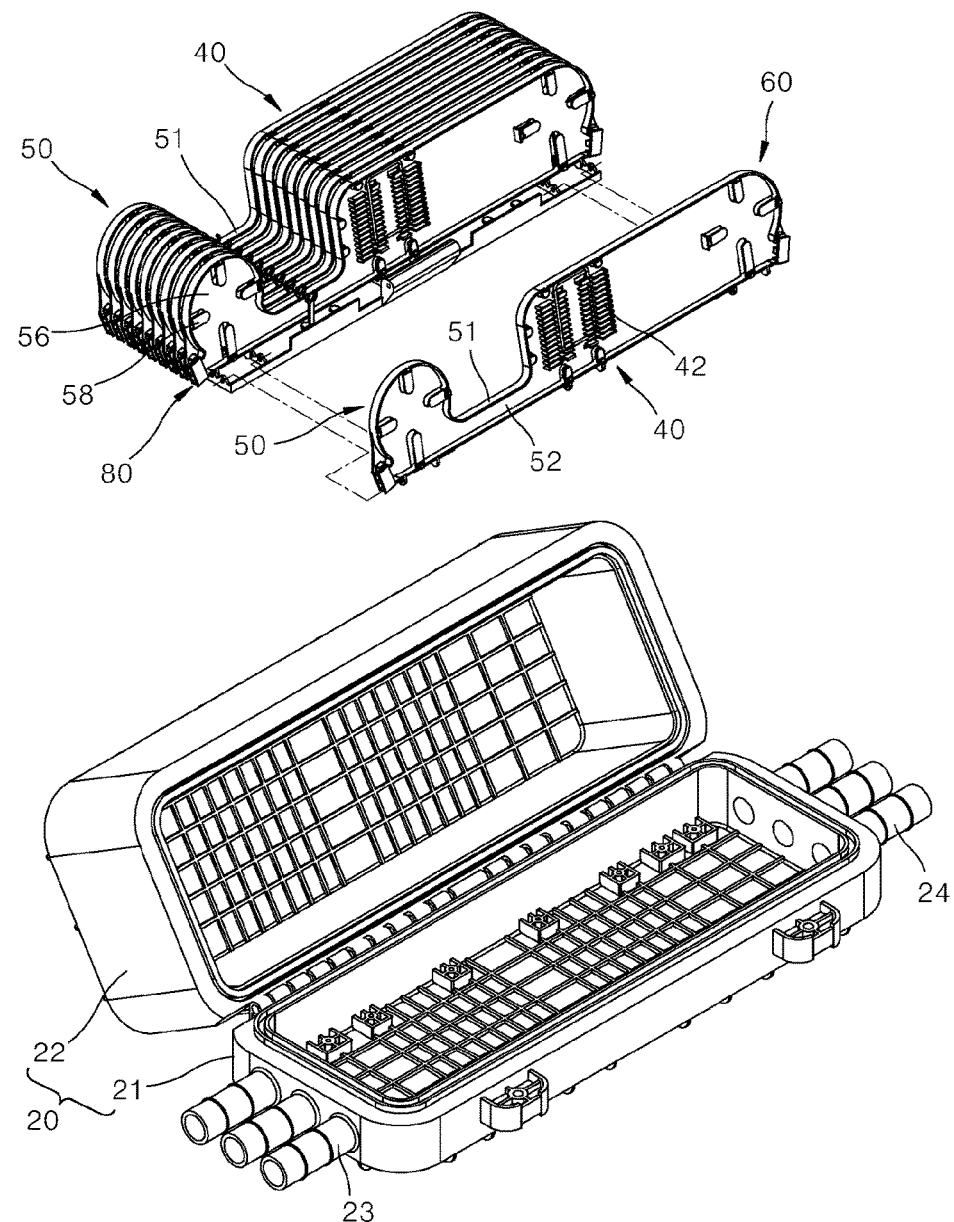
FIG. 7 is a perspective view illustrating a stacked optical fiber storage compartment according to an embodiment of the present invention.
Figure 8:
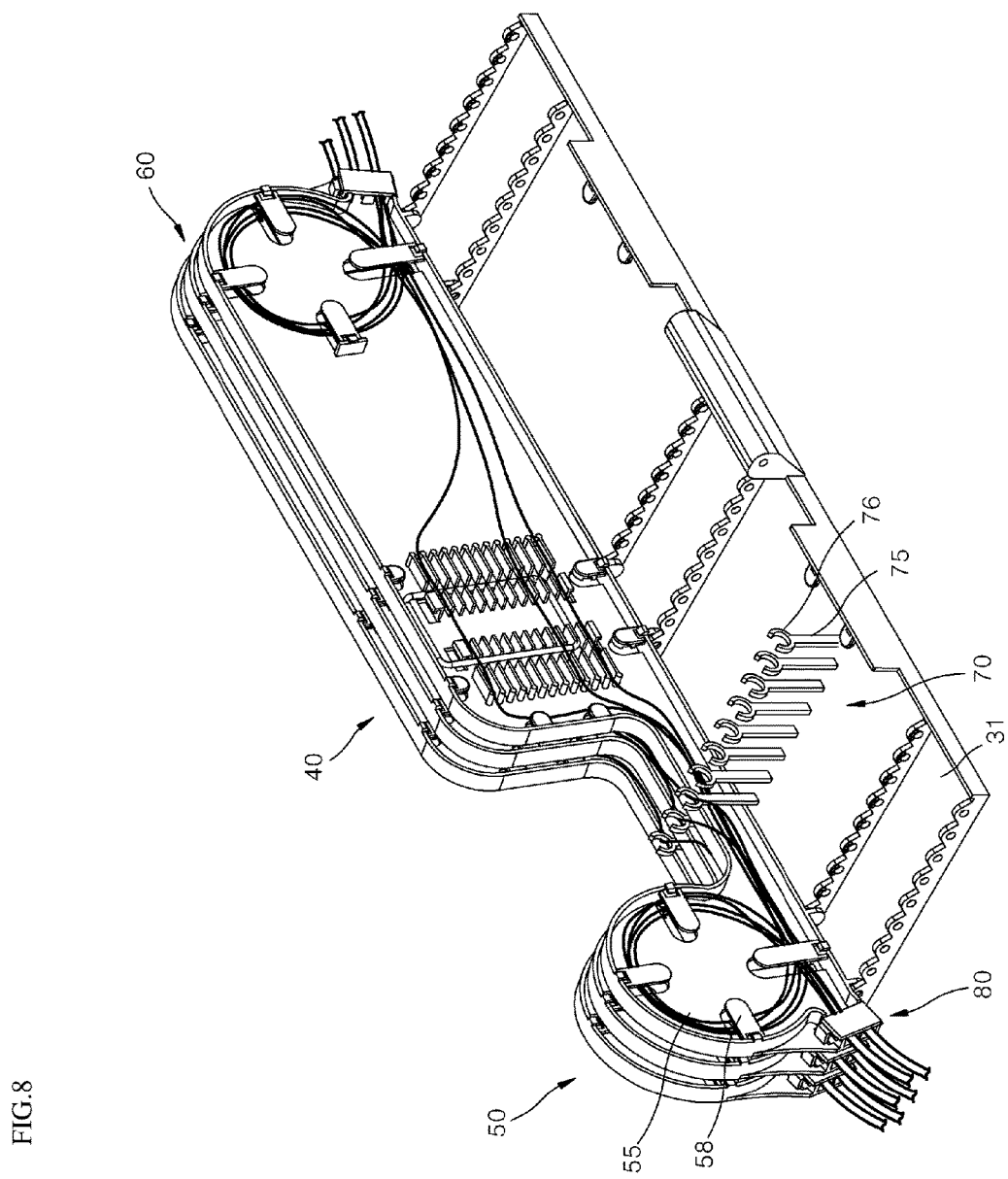
FIG. 8 is a perspective view illustrating an optical fiber splicing unit of FIG. 7.

As illustrated in FIGS. 7 and 8, the first excess trays 50 may be connected to one side of the splicing tube storing trays 40 by the first connecting rib 51, and the second excess trays 60 may be integrally formed with the splicing tube storing trays 40.

Figure 9:
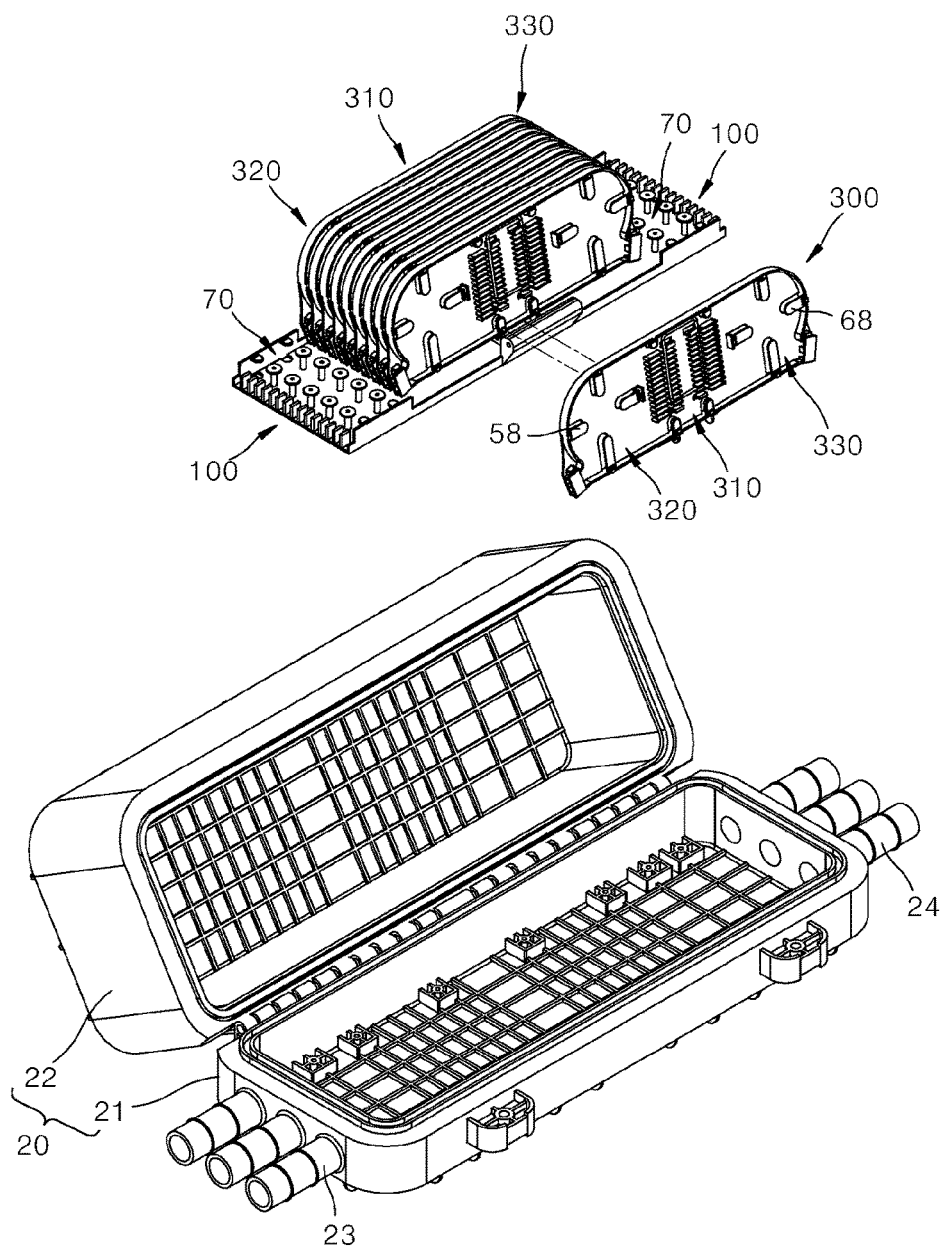
FIG. 9 is a perspective view illustrating a stacked optical fiber storage compartment according to an embodiment of the present invention.
Figure 10:
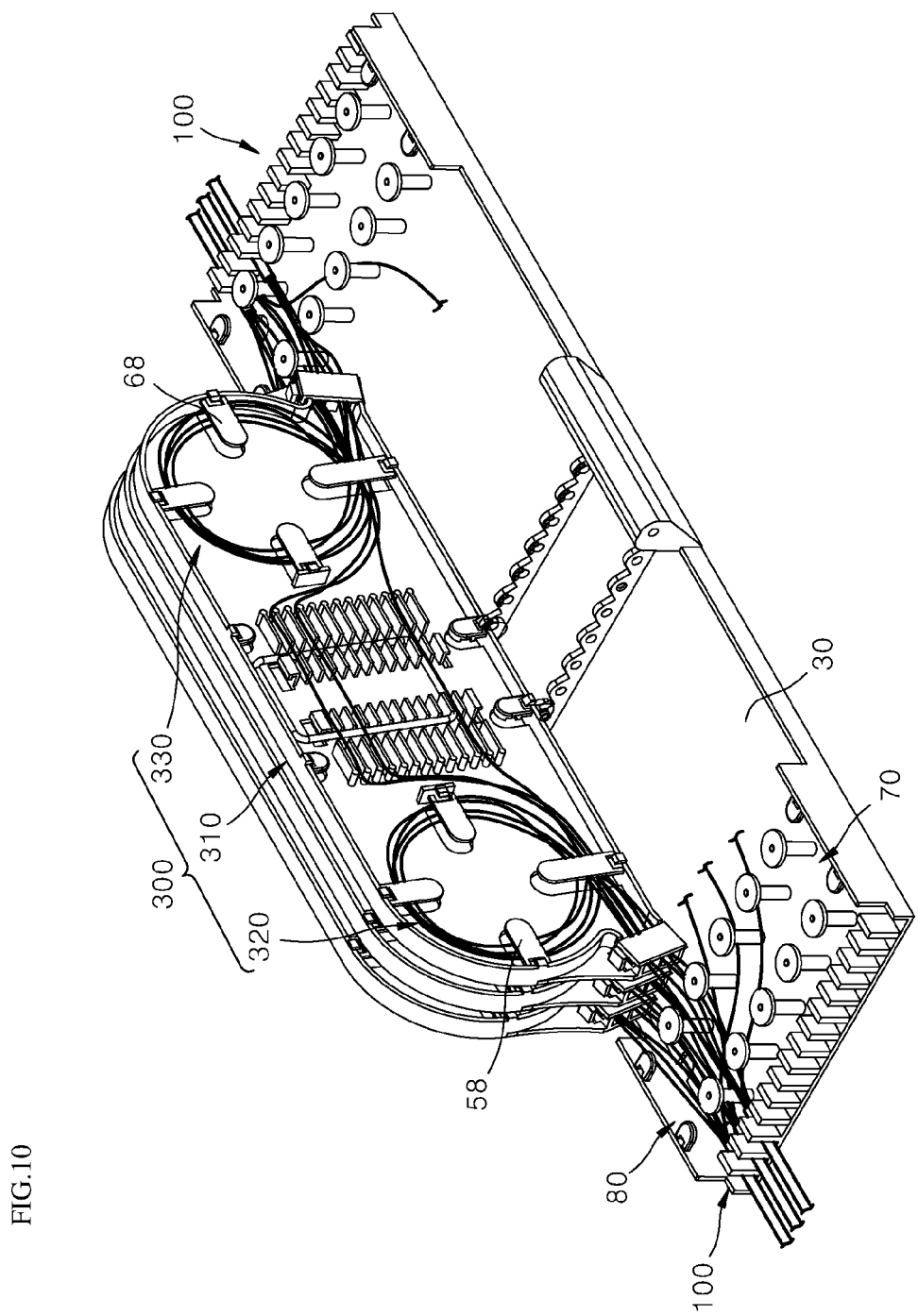
FIG. 10 is a perspective view illustrating an optical fiber splicing unit of FIG. 9.

FIGS. 9 and 10 illustrate a different embodiment in which the first and second excess trays are installed at both sides of the splicing tube storing trays.

Referring to the drawings, the splicing tube storing trays and the first and second excess trays are formed as a single tray, and the tray is formed shorter than a length of the support plate 31. A splicing tube storing tray part 310 and first and second excess tray parts 320 and 330 may be formed in the single tray 300.

Moreover, a tube support part that will be described below and the optical jump fiber support unit 70 are installed at both ends of the support plate 31.

In the embodiments described above, as illustrated in FIG. 11, the first excess tray 50 includes a first excess tray main body portion 55 as formed in a disc shape or a polygonal shape, and a first protruding step 56 is formed at an edge of the first excess tray main body portion 55 in a direction perpendicular thereto. A first tube and optical fiber introducing part 57 are formed at both sides adjacent to a portion coupled to the support plate 31. A tube fixing part 80 configured to fix tubes 210 introduced into a first tube and optical fiber introducing part 57 is formed in the first tube and optical fiber introducing part 57.

Moreover, first support ribs 58 configured to support optical fibers 220 extending from an end of the first protruding step 56 toward a central portion of the first excess tray main body portion 55 are formed.

Moreover, in the embodiments described above, the second excess trays 60 have substantially the same structure as the first excess trays 50.

That is, the second excess trays 60 includes a second excess tray main body portion 65 formed in a disc shape or a polygonal shape, and a second protruding step 66 is formed at an edge of the second excess tray main body portion 65 in a direction perpendicular thereto. A second tube and optical fiber introducing part 67 are formed at both sides adjacent to a portion coupled to the support plate 31. The tube fixing part 80 configured to fix tubes 210 introduced into the second tube and optical fiber introducing part 67 is formed in the second tube and optical fiber introducing part 67. The tube fixing part 80 has a structure same as that of the tube fixing part 80 formed in the first excess tray 50. Moreover, second support ribs 68 configured to support the optical fibers 220 extending from an end of a second protruding step 63 toward a central portion of the second excess tray main body portion 65 are formed.

Figure 11:
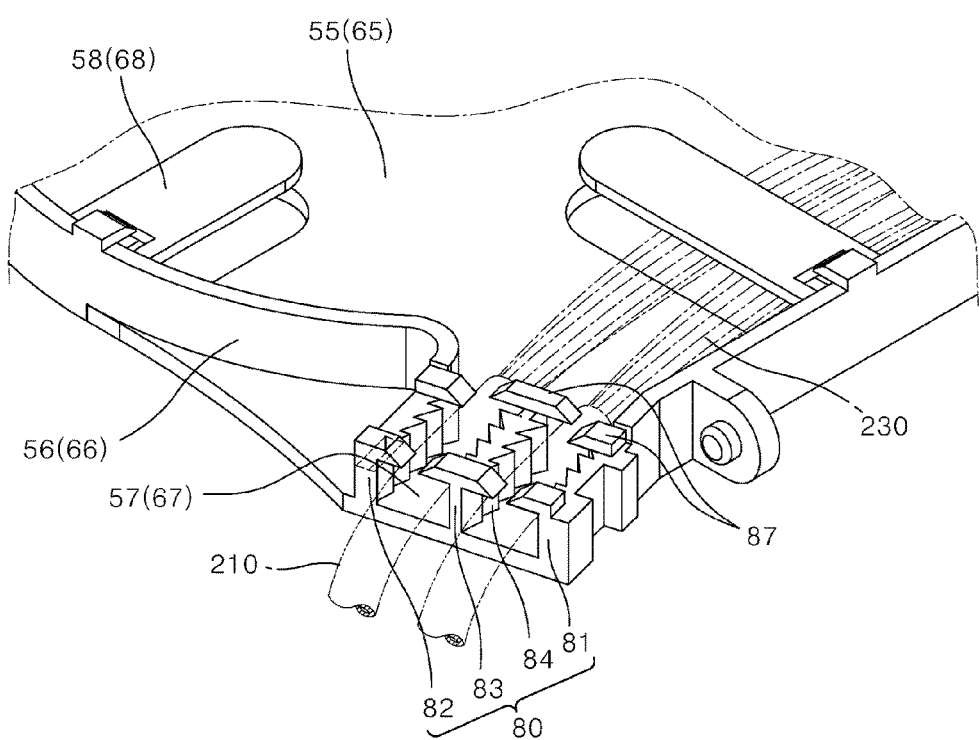
FIGS. 11 to 14 are partially cut-out perspective views of embodiments of a tube fixing part formed in first and second excess trays.

As illustrated in FIG. 11, the tube fixing part 80 formed at each of the first or second tube and optical fiber introducing parts 57 and 67 of the first and second excess trays 50 and 60 has first guide parts 81 and 82 extending from the first or second peripheral steps 56 and 66 formed at both sides of the tube and optical fiber introducing parts, and one or more first partition ribs 83 are formed between the first guide parts 81 and 82. Moreover, first gripping protrusions 84 configured to grip a tube are formed at surfaces of the first and second guide parts 81 and 82 and the first partition ribs 83 facing each other.

In the tube storage part configured as above, the tube 210 introduced into the first or second tube and optical fiber introducing part 57 or 67 of the first excess tray 50 or the second excess tray 60 may be pressed by the first gripping protrusions 84 and prevent deviation of a tube.

Figure 12:
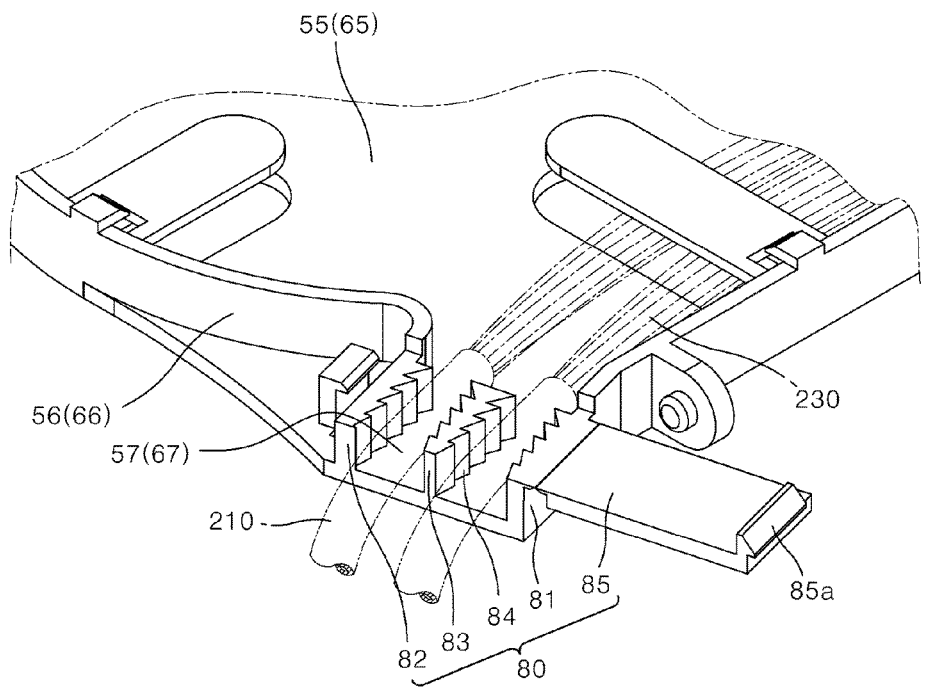

Moreover, as illustrated in FIG. 12, a cap 85 configured to surround the tube 210 supported by the first guide parts 81 and 82 is included in the first or second excess tray main body portions 55 and 65. The cap 85 is hinge-connected to one side of the first guide parts 81 and 82 by a flexible connecting part, and a locking step 85a locked to the first guide parts 81 and 82 at the other side or the first or second peripheral steps 56 and 66 is formed at an end of the cap 85. The cap 85 configured as above covers an open space while the tube 210 introduced into the first or second tube and optical fiber introducing part 57 and 67 are pressed and supported by the first gripping protrusions 84. Thus, the cap 85 may increase griping and supporting force of the tube 210.

Figure 13:
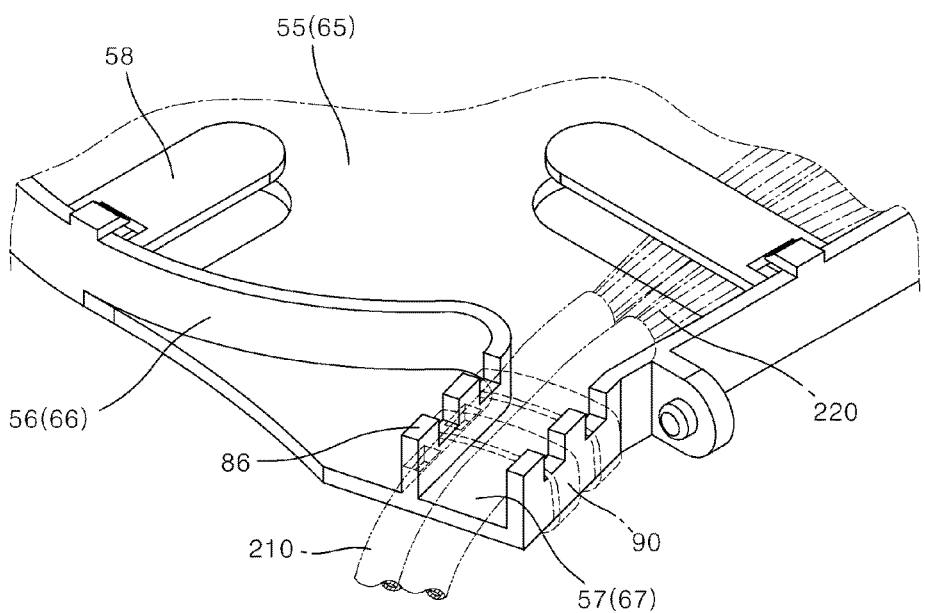

As illustrated in FIG. 13, in another embodiment of the tube fixing part 80, a tie bar 90 may be inserted into the first excess tray main body portion at a side adjacent to the first guide parts 81 and 82 of the first or second excess tray main body portions 55 and 65 to form a first coupling hole 86 capable of fixing the tube supported in the first guide part.

Meanwhile, in the embodiment, the first guide parts 81 and 82 extending from the first peripheral step are formed at both sides of the tube and optical fiber introducing parts 57 and 67, one or more first partition ribs 83 are formed between the first guide parts 81 and 82, and a first tube withdrawal preventing step 87 configured to prevent a withdrawal of a tube is formed at an end of the first guide parts 81 and 82 and an upper end of the first partition ribs 83 (see FIG. 11). The withdrawal preventing step 87 prevents the tube 210 from deviating from the first guide parts 81 and 82 of the tube fixing part 80.

Figure 14:
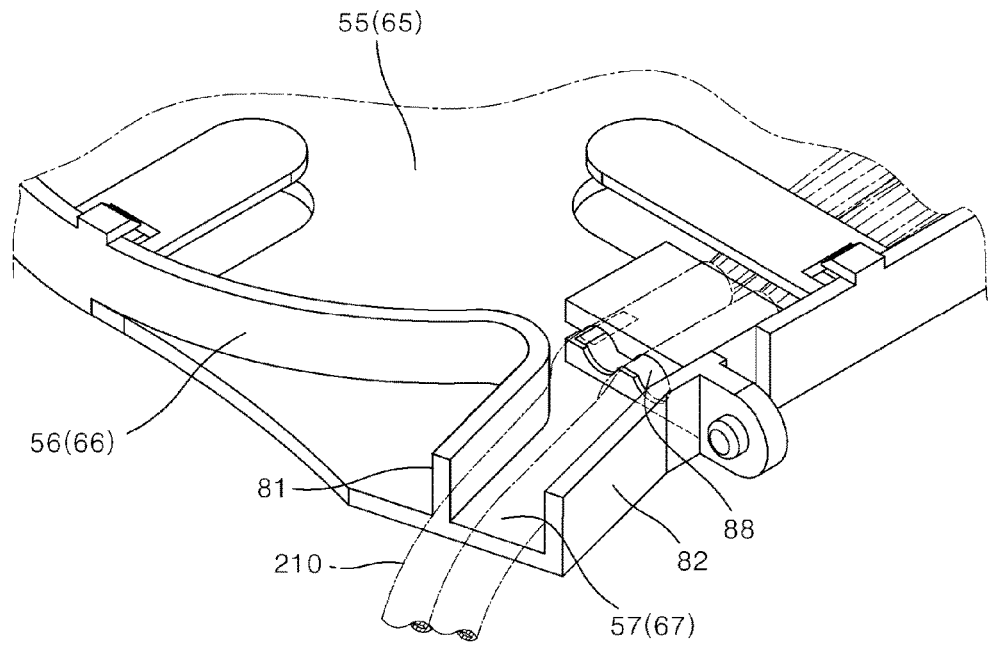

As illustrated in FIG. 14, yet another embodiment of the tube fixing part 80 includes a tube support hole 88 formed at a side adjacent to the tube and optical fiber introducing parts 57 and 67, and a tie bar (not illustrated) inserted into the tube support hole to tie the excess tray main boy portion and the tube. In this case, because the tube is tied with the tie bar while being inserted into the tube support hole 88, the tube 210 can be prevented from being discharged from the tube support hole 88.

Meanwhile, the optical jump fiber support unit 70 installed in the support plate 31 to support and guide the optical jump fibers 230 includes optical jump fiber guide rods 71 installed at a predetermined interval or in a matrix arrangement in the support plate 31 between the splicing tube storing trays 40 and the first excess trays 50 or the second excess trays 60, and a deviation preventing member 72 configured to prevent the optical jump fibers 230 from deviating from the optical jump fiber guide rods 71 is formed at an end portion of the optical jump fiber guide rods 71.

As illustrated in FIGS. 5, 6, 7, and 8, the optical jump fiber support unit 70 includes support rods 75 formed between the first or second connecting ribs 51 and 61, and a fiber support holder 76 configured to support the optical jump fibers 230 is installed between the support rods 75. The optical jump fibers 230 withdrawn from the first excess trays 50 or the second excess trays 60 are supported by the fiber support holder 76 and are guided toward the splicing tube storing trays 40 for connecting the optical jump fibers.

Moreover, as illustrated in FIGS. 9, 10, and 14, a tube gripping part 100 configured to grip the tubes 210 branched from the cables 200 and configured to surround the optical fibers is further included at both side surfaces of the support plate 31. The tube gripping part 100 has gripping ribs 101 installed at predetermined intervals at an upper surface of an edge of the support plate 31, and a tube deviation preventing step 102 configured to prevent deviation of the tubes 210 installed between the gripping ribs 101 is formed at an end of the gripping ribs 101. Moreover, protrusions for increasing a support force of tubes may be formed at surfaces facing the gripping ribs 101.

Figure 15:
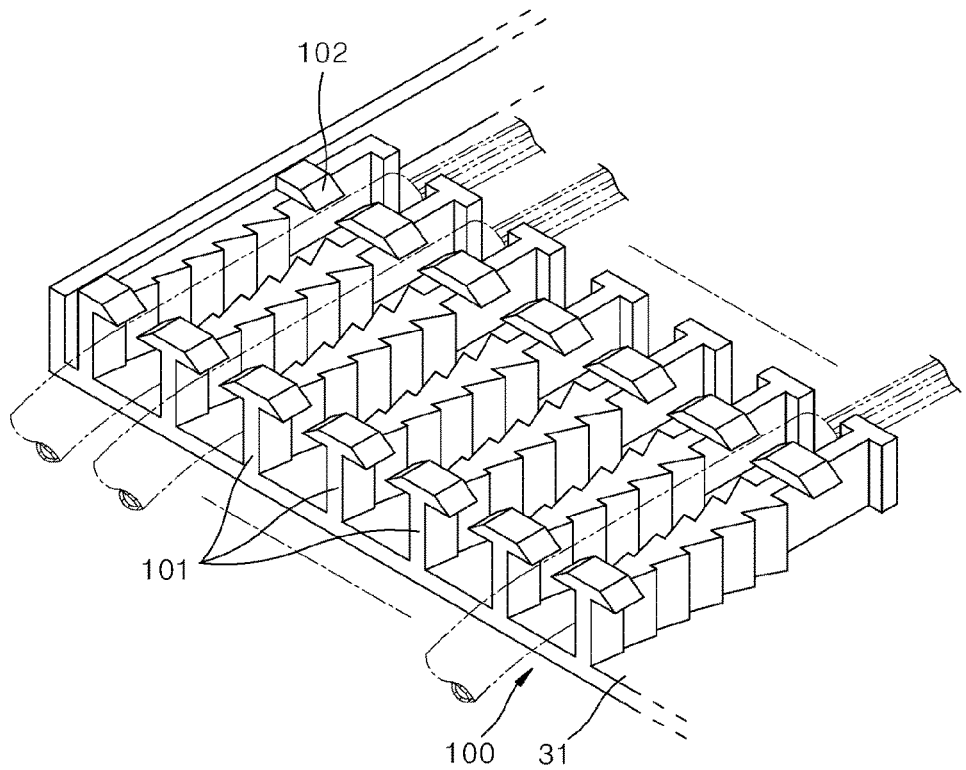
FIGS. 15 and 16 are partially cut-out perspective views illustrating embodiments of a tube gripping part formed in a support plate.
Figure 16:
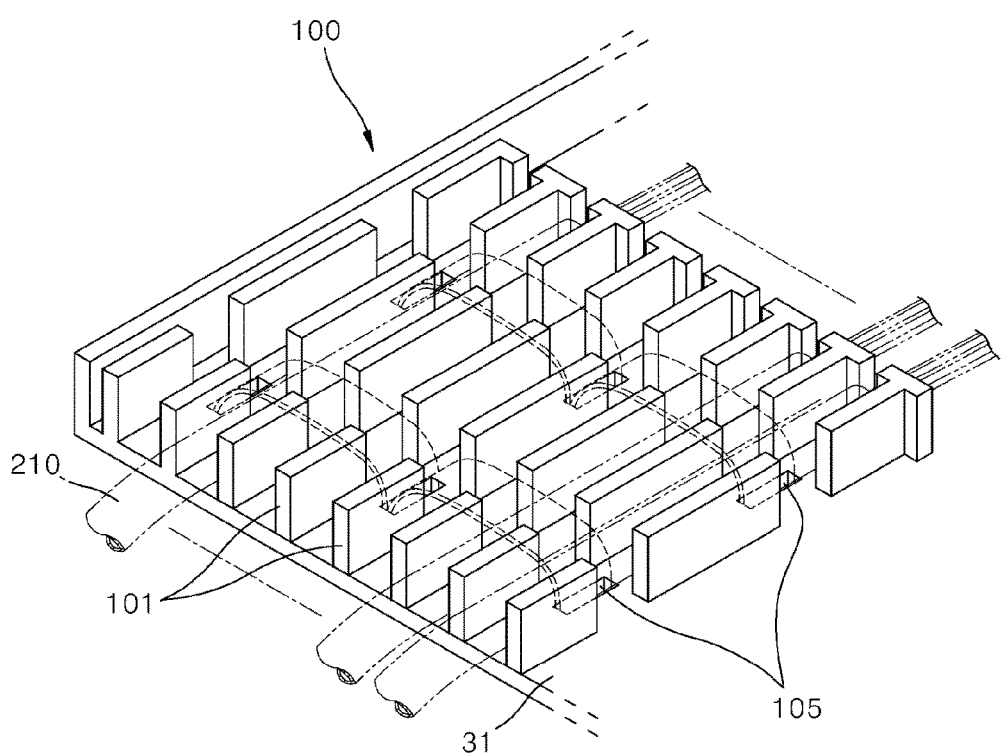

As illustrated in FIG. 15, a gripping hole 105 for tying tubes inserted into the gripping ribs 101 using a tie bar may be formed between the gripping ribs 101. In this case, preferably, the gripping ribs 101 are discontinuously formed, and the gripping ribs 101 are not formed at a side corresponding to the gripping hole 105. Although not illustrated in the drawings, the tube gripping part 100 installed at both sides of the support plate 31 may further include a cap for surrounding the tube gripping part 100.

Meanwhile, the optical jump fiber support unit 70 may be installed between the tube gripping part 100 formed in the support plate 31 and the first excess tray 50 or the second excess tray 60. The optical jump fiber support unit 70 is the same as that in the above-described embodiment.

The stacked optical fiber storage compartment 10 of the present invention configured as described above may sort a plurality of optical fibers for each type. The excess of each of the optical fibers 220 is individually wound and accommodated in the first excess tray 50 and the second excess tray 60, and the optical fibers 220 withdrawn from the first and second excess trays 50 and 60 are spliced to one another and are individually supported by the optical splicing tube storage parts 42.

The excess of the optical jump fibers 230 may Moreover be individually wound and accommodated in each of the first and second excess trays 50 and 60 according to their types, and the optical jump fibers withdrawn from the first and second excess trays 50 and 60 are guided by the optical jump fiber guide rods 71 of the optical jump fiber support unit 70, extended to one of the splicing tube storing trays 40, and spliced as described above.

In this process, because the tubes 220 surrounding the optical fibers are supported in the first and second excess trays 50 and 60 by the tube fixing part 80 or firmly supported by the tube gripping part 100 formed in the support plate 31, damage to optical fibers due to a decrease in tube gripping force as in the related art can be prevented.

Because the optical fibers arranged as above are separately sorted for each type and accommodated by the first and second excess trays 50 and 60, the optical fibers can be prevented from being tangled with one another or twisted. Because the optical jump fibers 230 are Moreover extended while being separated by the optical jump fiber guide rods, when performing work of switching the optical fibers in the future, a worker can promptly perform the work and prevent damage to other optical fibers from occurring during the work.

Although the present invention has been described with reference to embodiments illustrated in the drawings, the embodiments are merely illustrative. One of ordinary skill in the art should understand that various modifications and other equivalent embodiments are possible. Consequently, the actual technical scope of the present invention should be defined by the technical spirit of the appended claims.

The invention claimed is:

1. A stacked optical fiber storage compartment comprising:
   a compartment body including a main body portion having an accommodating space and an open upper portion, and an opening-and-closing cover rotatably coupled to the main body portion to open and close the open upper portion of the main body portion; and
   an optical fiber splicing unit that is installed in the main body portion for accommodating and splicing respective optical fibers drawn from respective tubes of optical cables extending into the compartment body, and includes a support plate mounted on the main body portion, splicing tube storing trays rotatably coupled to the support plate by a hinge shaft and having optical splicing tube storage parts for splicing optical fibers formed, first and second excess trays including first and second excess accommodating parts disposed at both sides of each of the splicing tube storing trays to support excess of an optical fiber or an optical jump fiber, and an optical jump fiber support unit installed at the support plate to support the optical jump fiber when an optical fiber supported in a first excess tray or a second excess tray is jumped to one of the splicing tube storing trays,
   wherein each of the first excess trays and the second excess trays are rotatably coupled to the support plate by the hinge shaft and are independently rotated.

2. The stacked optical fiber storage compartment of claim 1, wherein the first excess tray includes a first excess tray main body portion rotatably supported at the support plate by the hinge shaft, a first protruding step formed along an edge of the first excess tray main body portion and having a tube and an optical fiber introducing part formed at both sides, first support ribs extending from an end of the first protruding step toward a central portion of a first tray main body portion to support an optical fiber, and a tube fixing part formed in a first tube and optical fiber introducing part to fix the tube.

3. The stacked optical fiber storage compartment of claim 2, wherein the tube fixing part has first guide parts formed at both sides of the tube and optical fiber introducing part and extending from a first peripheral step, one or more first partition ribs formed between the first guide parts, and first gripping protrusions formed at opposing surfaces of the first guide parts and the first partition ribs to grip a tube.

4. The stacked optical fiber storage compartment of claim 3, wherein the first excess tray main body portion has a cap configured to surround a tube supported by the first guide part, and the cap is hinge-connected to one side of the first guide part by a flexible connecting part and has a locking step formed at an end and locked to the guide part or a first peripheral step at the other side.

5. The stacked optical fiber storage compartment of claim 2, wherein the tube fixing part has a first coupling hole through which a tie bar is inserted to the first excess tray main body portion at a side adjacent to a first guide part of the first excess tray main body portion to fix a tube supported by the first guide part.

6. The stacked optical fiber storage compartment of claim 2, wherein the tube fixing part has first guide parts formed at both sides of the tube and optical fiber introducing part and extending from a first peripheral step, one or more first partition ribs formed between the first guide parts, and a first tube withdrawal preventing step formed at an end of the first guide parts and an upper end of the first partition ribs to prevent a withdrawal of the tube.

7. The stacked optical fiber storage compartment of claim 2, wherein the tube fixing part has a tube fixing part having a tube support groove with one open side formed at a side adjacent to the tube and optical fiber introducing part, and a tie bar for typing the tube fixing part, the excess tray main body portion, and the tube fixing part.

8. A stacked optical fiber storage compartment comprising:
   a compartment body including a main body portion having an accommodating space and an open upper portion, and an opening-and-closing cover rotatably coupled to the main body portion to open and close the open upper portion of the main body portion;
   an optical fiber splicing unit that is installed in the main body portion for accommodating and splicing respective optical fibers drawn from respective tubes of optical cables extending into the compartment body, and includes a support plate mounted on the main body portion, splicing tube storing trays rotatably coupled to the support plate by a hinge shaft and having optical splicing tube storage parts for splicing optical fibers formed, first and second excess trays including first and second excess accommodating parts disposed at both sides of each of the splicing tube storing trays to support excess of an optical fiber or an optical jump fiber, and an optical jump fiber support unit installed at the support plate to support the optical jump fiber when an optical fiber supported in a first excess tray or a second excess tray is jumped to one of the splicing tube storing trays; and
   a tube gripping part installed at both side surfaces of the support plate, branched from a cable, and configured to grip tubes that surround optical fibers,
   wherein the tube gripping part has gripping ribs installed at predetermined intervals at an upper surface of an edge of the support plate, and a tube deviation preventing step configured to prevent deviation of the tubes installed between the gripping ribs is formed at an end of the gripping ribs.

9. A stacked optical fiber storage compartment comprising:
   a compartment body including a main body portion having an accommodating space and an open upper portion, and an opening-and-closing cover rotatably coupled to the main body portion to open and close the open upper portion of the main body portion; and
   an optical fiber splicing unit that is installed in the main body portion for accommodating and splicing respective optical fibers drawn from respective tubes of optical cables extending into the compartment body, and includes a support plate mounted on the main body portion, splicing tube storing trays rotatably coupled to the support plate by a hinge shaft and having optical splicing tube storage parts for splicing optical fibers formed, first and second excess trays including first and second excess accommodating parts disposed at both sides of each of the splicing tube storing trays to support excess of an optical fiber or an optical jump fiber, and an optical jump fiber support unit installed at the support plate to support the optical jump fiber when an optical fiber supported in a first excess tray or a second excess tray is jumped to one of the splicing tube storing trays, wherein the optical jump fiber support unit includes support rods installed at the support plate between the splicing tube storing tray and the first excess tray or the second excess tray, and a fiber support holder installed at an end of the support rods to support the optical jump fibers.

* * * * *